US006907402B1

(12) United States Patent
Khaitan

(10) Patent No.: US 6,907,402 B1
(45) Date of Patent: Jun. 14, 2005

(54) COMMODITY TRADING SYSTEM

(76) Inventor: Ajay P. Khaitan, 1 Fernville Road, Gosforth, Newcastle upon Tyne NE3 4HT (GB)

(*) Notice: Subject to any disclaimer, the term of this patent is extended or adjusted under 35 U.S.C. 154(b) by 507 days.

(21) Appl. No.: 09/738,940

(22) Filed: Jul. 25, 2000

(51) Int. Cl.$^7$ .............................................. G06F 17/60
(52) U.S. Cl. .............................. 705/26; 705/37; 705/80
(58) Field of Search .............................. 705/26, 37, 80; 110/112

(56) References Cited

U.S. PATENT DOCUMENTS

| | | | | |
|---|---|---|---|---|
| 4,193,354 | A | * 3/1980 | Woods | 110/212 |
| 6,493,683 | B1 | * 12/2002 | David et al. | 705/37 |
| 2001/0034688 | A1 | * 10/2001 | Annunziata | 705/37 |
| 2002/0004788 | A1 | * 1/2002 | Gros et al. | 705/80 |
| 2002/0032632 | A1 | * 3/2002 | Sernet | 705/37 |

FOREIGN PATENT DOCUMENTS

JP    02000113057 A  *  4/2000  ............ G06F/17/60

OTHER PUBLICATIONS

Shook, Barbara; "Court gives FERC 60 days to devise new open–access rule"; 2 STAR Edition; Houston Chronicle [pre-1997 Full text]; Houston; Texas; Oct. 19, 1989.*
Moorhouse, John C; "Competitive markets for electricity generation"; Cato Journal ; Washington ; Winter 1995; vol. 4; Iss.3; p. 421,; p. 1, extracted on Internet from Proquest database on Aug. 17, 2004., 13 marked pages.*
Press release; "Yadana Developers Agree to Reduce Penalties"; Business Day; Bangkok; Aug. 3, 1999, extracted on Internet from Proquest database on Aug. 17, 2004.*
Bochenski, Feliks G; Enclave Projects, Finance and Development 9pre–1986); Mar. 1971; 8, 000001; ABI/INFORM Global, pp. 22–2.*
Brief Article, Closeout shares. (Consolidated Stores Corp.) (Money & Investments) (Brief Article); Forbes, v156, n2, p322 (2), Jul. 17, 1995, extracted from Dialog database.*
Larson, Alexander C., Antitrust tie–in analysis after Kodak: a comment. (response to Warren S. Grimes, Antitrust Law Journal vol. 62, p. 263, Winter 1994); Antitrust Law Journal, 63, n1, 239–266, Fall, 1994, ISN: 0003–6056 extracted from Dialog File 148 o.*
) Ming et al. of University of Texas at Austin, "A web–based Financial trading system "; 1999 IEEE extracted on Internet on Apr. 25, 2003.*

* cited by examiner

Primary Examiner—Yogesh C. Garg
(74) Attorney, Agent, or Firm—Michael B. Fein; Brian L. Belles; Cozen O'Connor PC

(57) ABSTRACT

A method for buying commodities comprising identifying suppliers of commodities having surplus capacities; entering into take or pay supply agreements for a plurality of commodities with one or more of said suppliers, each of said supply agreements specifying a cost for an individual commodity, said cost being less than market cost for said individual commodity in the absence of said take or pay supply agreement. A method of selling commodities comprising identifying combinations of commodities which are generally used by industrial consumers and establishing a price for each combination, said price being lower than the sum of said market costs of said individual commodities; and establishing a Web site at which said identified combinations of commodities are offered for sale at said price, wherein no price for an individual commodity is quoted. The method of buying and selling can be combined. A computer system for implementing the method delivers Web pages offering for sale to industrial customers a combination of individual commodities at a price which is lower than the sum of the market prices of the individual commodities.

15 Claims, 3 Drawing Sheets

COMMODITY TRADING SYSTEM

BACKGROUND OF THE INVENTION

This invention relates to commodity trading systems and automated purchasing and selling systems.

The process of purchasing and selling commodities traditionally involves brokers and traders who determine the price and availability of commodities from a supplier and who negotiate with buyers of the commodity to have a desired commodity delivered at a higher price. Traditional methods involve determining the market price for a commodity when purchased in the quantity desired by the buyer, and then supplying that commodity in that quantity plus a commission paid by the buyer or with a discount paid by the supplier. Commodities are also bought and sold between a producer and an end user on a principal to principal basis.

Computer systems for buying and selling commodities are conventionally used, but such conventional systems implement transactions wherein a commodity is purchased and sold at a market price.

SUMMARY OF THE INVENTION

It is an object of the invention to provide an automated, computer implemented method for purchasing commodities at prices which are below market prices.

It is another object of the invention to provide an automated computer implemented method of selling commodities.

A further object is to provide a computer implemented combined method of buying and selling commodities which is more efficient and effective than prior art methods.

These objects, and others which will become apparent from the following disclosure, are achieved by the present invention which comprises in one aspect a method of selling commodities comprising: (a.) identifying combinations of commodities which are generally used by industrial consumers and establishing a price for each combination, said price being lower than the sum of said market costs of said individual commodities; and (b.) establishing a Web site at which said identified combinations of commodities are offered for sale at said price, wherein no price for an individual commodity is quoted.

In another aspect, the invention comprises a method of buying commodities comprising: (a.) identifying suppliers of commodities having surplus capacities; and (b.) entering into take or pay supply agreements for a plurality of commodities with one or more of said suppliers, each of said supply agreements specifying a cost for an individual commodity, said cost being less than market cost for said individual commodity in the absence of said take or pay supply agreement.

The invention also comprises a system for selling commodities comprising a programmed computer system adapted to deliver Web pages offering for sale to industrial consumers a combination of individual commodities at a combination price which is lower than the sum of the market prices of the individual commodities.

Regarding the buying aspect of the invention, because the purchase contracts are based on take or pay contracts for surplus or marginal capacity of the manufacturer or supplier, a lower price, with higher risk is obtained and is passed on in part to the customer of the commodities. By "surplus" capacity we mean the positive difference between installed capacity/production capability and actual profitable sales, at a given point in time or perennially. By "marginal" capacity we mean the subset of surplus capacity for which variable costs of production, excluding labor, represent the total cost of production.

Regarding the selling aspect of the invention, the commodities are offered only in predetermined combinations of two or more commodities at prices which are below the sum of the market prices of the two or more commodities so that the buyer is not aware of the price attributed to each of the separate commodities.

Manufacturers or suppliers of commodities have incentive to enter into such supply contracts because the intermediary carrying out the invention would normally agree not to approach existing customers of those manufacturers or suppliers, and also because they are able to utilize marginal capacity and/or sell their surpluses.

On the purchase side, identification of a supplier with surplus or marginal capacity is computer-implemented in a preferred aspect of the invention. On the sell side, offers are automatically made and accepted with little or no human intervention, which is quite different then the usual methods of selling commodities. A relational database can be used to process data to identify the suppliers of commodities having surplus capacities and rank the surplus capacities of commodities in order of best opportunities for profitable disposal of commodities and/or largest spread between cost to purchase the surplus capacities and probable selling price of the commodities. A sphere of influence for a commodity supplier is defined as a territory in which the commodity supplier normally sells most of its output, preferably at least about 80 percent of its output, and such sphere of influence is preferably included in the relational database. The database can also include demand numbers for each commodity in each territory and each sphere of influence and such numbers can be included in the relational database. The database preferably includes core tables of basic information about plants, customers, and products, linking tables of information linking the core boxes with each other, and other tables.

On the selling side, the offering price of combinations of commodities can be automatically adjusted based on one or more factors selected from the group consisting of currency exchange rates, currency risk, credit risk, country specific political risk, delivery dates, delivery locations, freight costs, Customs duties, and remaining available amount of each commodity in a particular combination under the take or pay supply agreements. Preferably, upon selection of an identified combination of commodities by an industrial consumer at the Web site, the industrial consumer may specify desired purchase contract terms such as quantity, date, and delivery location, and then the customer may enter via the Web site into an automatically generated binding purchase contract to purchase the selected identified combination of commodities under the selected terms.

It is preferred that none of the suppliers is identified on the intermediary's Web site. In some embodiments, the combinations of commodities are branded only with a name or mark of an owner of the Web site, usually the intermediary in order to prevent the customer from going directly to the supplier, and to protect the supplier from publicizing that it has surplus or marginal capacity.

The relational database can be used to determine likely variable costs, marginal capacities, sphere of influence, freight, foreign exchange rates, and/or labour costs and to rank suppliers of commodities in order of likely profitability for a given commodity to be purchased and resold.

In each case, the apparatus to carry out the method is a computer system programmed to deliver Web pages offering for sale to industrial consumers a combination of individual commodities at a combination price which is lower than the sum of the market prices of the individual commodities. The combination price is preferably automatically calculated based on the prices specified in one or more take or pay agreements for commodities which have been negotiated with one or more suppliers of said commodities, the agreements specifying a cost for an individual commodity which is less than market cost in the absence of the take or pay agreement. The computer can automatically calculate the sum of the individual costs plus a profit factor, further adjusted by one or more factors selected from the group consisting of quantity, date, currency exchange rates, currency risk, credit risk, country specific political risk, delivery dates, delivery locations, freight costs, Customs duties, and remaining available amount of each commodity in a particular combination under the take or pay supply agreements. On the purchase side, the relational database can be used to identify suppliers of commodities having surplus capacities and a processor adapted to rank the surplus capacities of commodities in order of best opportunities for profitable disposal of commodities and/or largest spread between cost to purchase the surplus capacities and probable selling price of said commodities

BRIEF DESCRIPTION OF THE DRAWINGS

The figures depict a preferred embodiment of the present invention for purposes of illustration only. One skilled in the art will readily recognise from the following discussion that alternative embodiments of the structures and methods illustrated herein may be employed without departing from the principles of the invention described herein.

DETAILED DESCRIPTION OF THE DRAWINGS AND THE PREFERRED EMBODIMENTS

The figures depict a preferred embodiment of the present invention for purposes of illustration only. One skilled in the art will readily recognize from the following discussion that alternative embodiments of the structures and methods illustrated herein may be employed without departing from the principles of the invention described herein.

Commodities are defined as industrial, mineral and agricultural products that are available in abundance (supply/capacity generally exceeds demand), for which quality differentiators between different sources of the same product (wherever in the world they may be located) are nominal, which have fair levels of global trade and product-mobility, and where competitive pricing is the crucial factor in a buying decision. Examples of Commodities would include industrial minerals, metals, paper & pulp, rubber, chemicals, petrochemicals etc.

Figure 1:
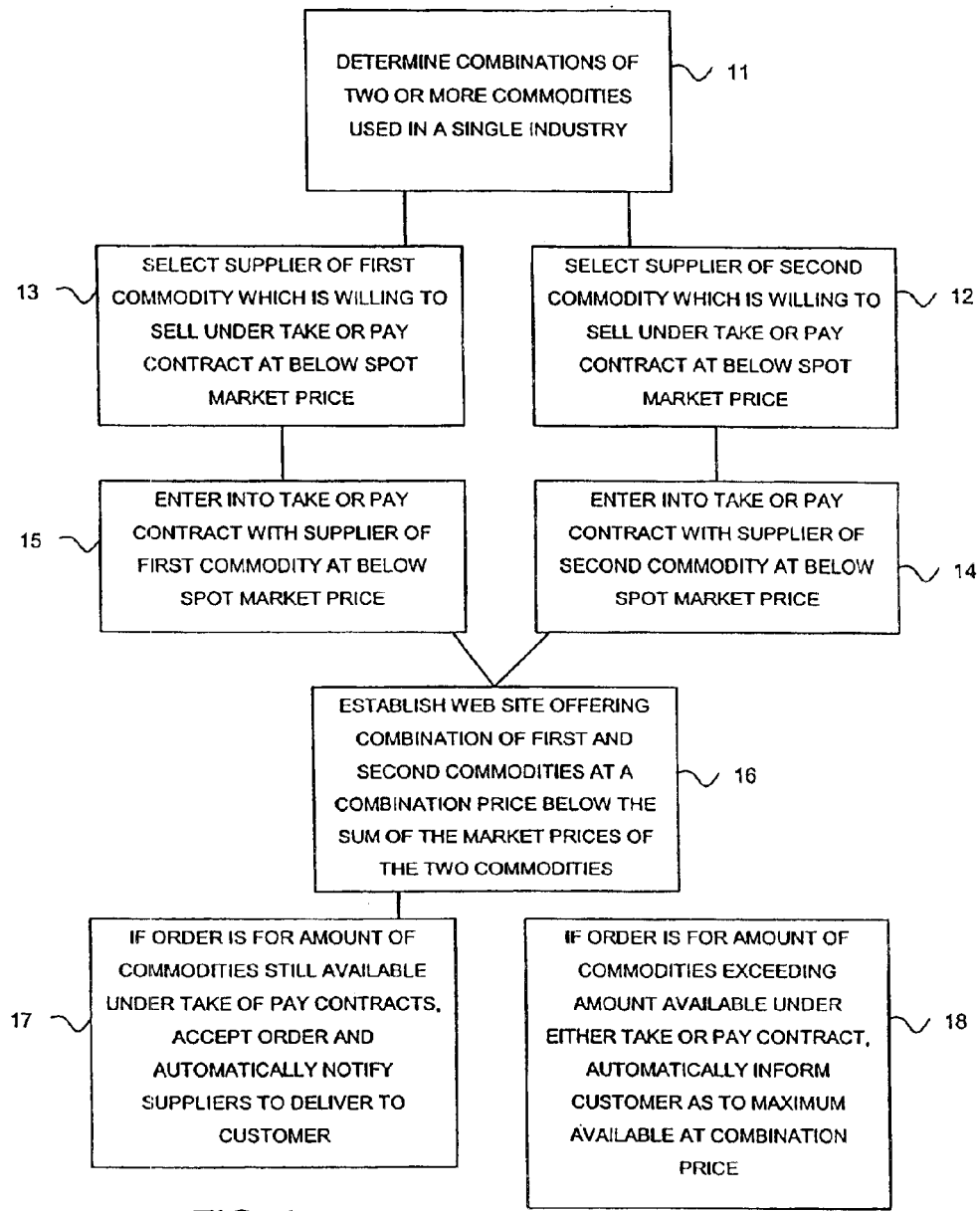
FIG. 1 is a block diagram illustrating a preferred embodiment of an overview of the method of the invention.

Referring to FIG. 1, one of the first steps in the process is to determine 11 combinations of two or more commodities used in a single industry. For example, in the steel industry both raw iron and coke are used in more or less fixed ratios which are readily determined by those familiar with this industry. Assuming the conventional ratio is two tons of coke per ten tons of raw iron, the next step is to identify possible suppliers of the first commodity, coke and possible suppliers of the second commodity, raw iron, and select 13 a supplier of the first commodity. Many combinations of commodities are possible for the steel industry or any other industry where more than one commodity is normally purchased on a regular basis. On a separate track, and not necessarily at the same time, a supplier of the second commodity is selected 12.

The selection process can be automated with the assistance of a computer, wherein factors such as existing customers of a prospective supplier, sphere of influence, i.e., geographical area wherein at least about 80 percent or more of that supplier's customers are located, amount of margin between price offered under take or pay contract and spot market price of the commodity, surplus volume available from that supplier, whether the complimentary commodity (e.g., raw iron in the case of coke) is available at favorable pricing, and the like.

Once a supplier is selected, a contract for a commodity is automatically generated and entered into 15 and 16, specifying the price, which must be below spot or market price, delivery locations, time requirements, and the like.

When supply contracts for appropriate combinations of commodities are entered into, the combinations are offered on a Web site 16 wherein only the identity of the organization offering the combination is given, i.e., preferably the suppliers' identifications are not given, and only the combination price is set forth, i.e., not the price of each individual commodity. Also given are delivery terms, locations, and other details needed to form a sales contract with the user.

If the order proposed by the user is for an amount wherein sufficient quantities of each commodity are available under the take or pay contracts, then the order is automatically accepted 17 and the order is processed by passing on delivery instructions to each of the separate suppliers of each commodity of the combination sold. Preferably, the automatic acceptance 17 is not immediate, but within twenty-four hours in order to allow the system time to contact alternative suppliers which may offer the best terms. If the amount exceeds the amount available, the user is automatically informed 18 as to the maximum amount available.

Figure 2:
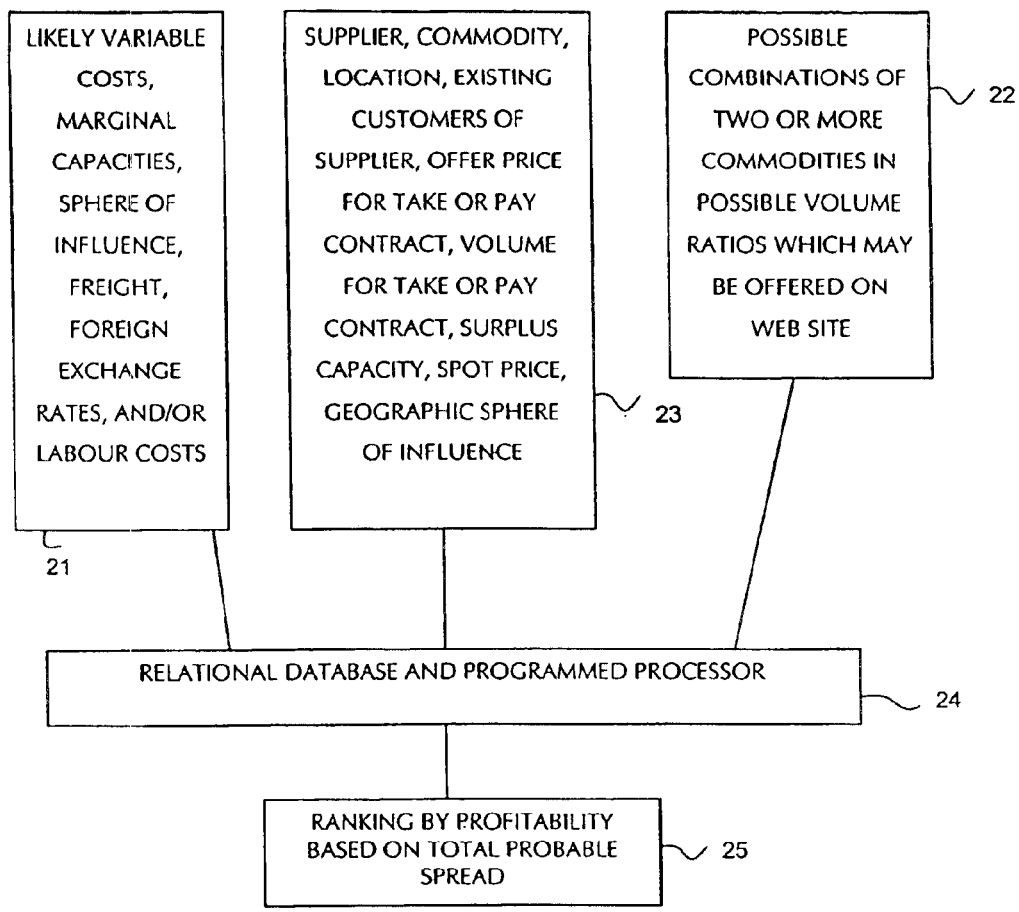
FIG. 2 is a block diagram illustrating an embodiment of the profitability ranking system of the invention utilizing a computer having a relational database in which are records of certain information.

Referring now to FIG. 2, the computer 24 can be used to rank 25 suppliers of commodities in order of likely profitability for a given commodity to be purchased and resold based on many factors, including likely variable costs, marginal capacities, sphere of influence, freight, foreign exchange rates, and/or labour costs 21. For each supplier, the database 24 includes information 23 such as the commodity which can be supplied, supplier location, existing customers of supplier, offer price for take or pay contract, volume for take or pay contract, surplus or marginal capacity of that supplier, spot price, geographic sphere of influence, i.e., where at least about 80 percent or more of that supplier's customers are located for that commodity. The database also includes possible combinations 22 of two or more commodities, e.g., the aforementioned raw iron and coke, and possible volume ratios in which those combinations can be offered.

Figure 3:
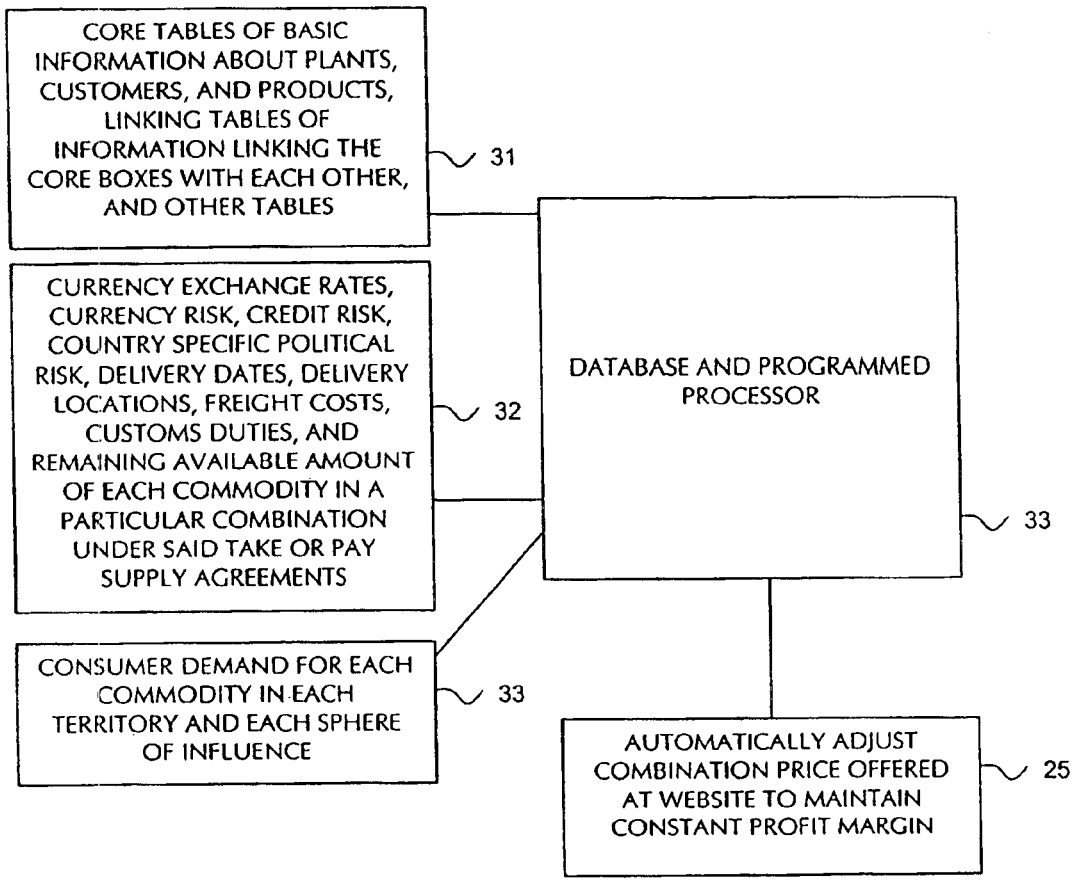
FIG. 3 is a block diagram illustration of an automated method of adjusting the offer price for combinations of commodities.

Referring to FIG. 3, the computer comprising the database and programmed processor 33 is also used to automatically adjust the combination price offered at the Web site to maintain a constant profit margin 25 or a target profit margin, automatically processing a number of factors, including consumer demand 33 for each commodity in each territory and each sphere of influence, quantifiable currency exchange rates, currency risk, credit risk, country specific political risk, delivery dates, delivery locations, freight costs, customs duties, and remaining available amount of each commodity in a particular combination under said take or pay supply agreements 32, and using core tables of basic information about plants, customers, and products, and linking tables of information linking the core boxes with each other, and other tables.

The method of the invention is advantageous to the commodity suppliers, the intermediary who operates the Web site, database, and computer, and to the customers who use and consume the commodities. The suppliers are able to sell volumes which they would not ordinarily have been able to sell without lowering their overall price, which would affect their prices with existing customer. Furthermore, they can be assured that the intermediary will not be competing with them in their "sphere of influence," that the fact that they are the actual supplier will not be made known to their existing customers or to the market, and that they have a chance to profit further if the intermediary Web site operator is unable to take the contracted amount and must pay for it anyway.

The intermediary is reasonably assured a profit because the computer is programmed to adjust the prices to guarantee a given profit margin. The intermediary's incremental cost of sales is very low because of the automation provided by this invention.

The consumer who purchases combinations of commodities through the Web site has the advantage of one stop shopping for the combination, and is also able to purchase the combination at a lower price than spot or market price.

The foregoing discussion discloses and describes merely exemplary embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A method of buying and selling commodities comprising:
   a. identifying suppliers of commodities having surplus capacities;
   b. entering into take or pay supply agreements for a plurality of commodities with one or more of said suppliers, each of said supply agreements specifying a cost for an individual commodity, said cost being less than market cost for said individual commodity in the absence of said take or pay supply agreement;
   c. identifying combinations of commodities which are generally used by industrial consumers and establishing a price for each combination using a processing device, said price being the sum of the cost of the individual commodities specified in said supply agreements plus a profit factor but said price being lower than the sum of said market costs of said individual commodities;
   d. establishing a Web site at which said identified combinations of commodities are offered for sale at said price, wherein no price for an individual commodity is quoted;

wherein said price is automatically adjusted by a processing device based on one or more factors selected from the group consisting of currency exchange rates, currency risk, credit risk, country specific political risk, delivery dates, delivery locations, freight costs, Customs duties, and remaining available amount of each commodity in a particular combination under said take or pay supply agreements; and wherein a relational database is used to process data to identify said suppliers of commodities having surplus capacities and rank the surplus capacities of commodities in order of best opportunities for profitable disposal of commodities and/or largest spread between cost to purchase said surplus capacities and probable selling price of said commodities.

2. Method according to claim 1 wherein upon selection of an identified combination of commodities by an industrial consumer at said Web site, said industrial consumer may specify desired purchase contract terms selected from the group consisting of quantity, date, and delivery location and then may enter into an automatically generated binding purchase contract to purchase said selected identified combination of commodities under said selected terms.

3. Method according to claim 1 wherein none of said suppliers' identity is disclosed at said Web site.

4. Method according to claim 1 wherein said combinations of commodities are branded only with a name or mark of an owner of said Web site.

5. Method according to claim 1 wherein a sphere of influence for a commodity supplier is identified as a territory in which the commodity supplier normally sells at least 90 percent of its output and the sphere of influence is included in the relational database.

6. Method according to claim 1 wherein consumer demands for each commodity in each territory and each sphere of influence is determined and included in the relational database.

7. Method according to claim 1 wherein the database includes core tables of basic information about plants, customers, and products, linking tables of information linking the core boxes with each other, and other tables.

8. Method according to claim 1 wherein the relational database is used to determine likely variable costs, marginal capacities, sphere of influence, freight, foreign exchange rates, and/or labour costs and to rank suppliers of commodities in order of likely profitability for a given commodity to be purchased and resold.

9. System for selling commodities comprising a programmed computer system adapted to deliver Web pages offering for sale to industrial consumers a combination of individual commodities at a combination price which is lower than the sum of the market prices of the individual commodities wherein said combination price is automatically calculated based on the prices specified in one or more take or pay agreements for commodities which have been negotiated with one or more suppliers of said commodities, said agreements specifying a cost for an individual commodity which is less than market cost in the absence of said take or pay agreement;

wherein said combination price which is automatically calculated is the sum of the individual costs plus a profit factor, and is further adjusted using a processing device by one or more factors selected from the group consisting of quantity, date, currency exchange rates, currency risk, credit risk, country specific political risk, delivery dates, delivery locations, freight costs, Customs duties, and remaining available amount of each commodity in a particular combination under said take or pay supply agreements;

comprising a relational database comprising data identifying said suppliers of commodities having surplus capacities and a processor adapted to rank the surplus capacities of commodities in order of best opportunities for profitable disposal of commodities and/or largest spread between cost to purchase said surplus capacities and probable selling price of said commodities.

10. System according to claim 9 wherein said Web pages do not identify said suppliers but only identify the operator of said system or the mark of said operator.

11. System according to claim 9 wherein a sphere of influence for a commodity supplier is identified as a territory in which the commodity supplier normally sells at least 90 percent of its output and the sphere of influence is included in the relational database.

12. System according to claim 9 wherein in the relational database comprises consumer demand for each commodity in each territory and each sphere of influence.

13. System according to claim 9 wherein the database includes core tables of basic information about plants, customers, and products, linking tables of information linking the core boxes with each other, and other tables.

14. System according to claim 9 wherein the processor is adapted to determine likely variable costs, marginal capacities, sphere of influence, freight, foreign exchange rates, and/or labour costs and to rank suppliers of commodities in order of likely profitability for a given commodity to be purchased and resold.

15. System according to claim 9 wherein the processor is adapted to automatically adjust price based on one or more factors selected from the group consisting of currency exchange rates, currency risk, credit risk, country specific political risk, delivery dates, delivery locations, freight costs, Customs duties, and remaining available amount of each commodity in a particular combination under said take or pay supply agreements.

* * * * *